United States Patent [19]

Guest

[11] Patent Number: 5,603,532
[45] Date of Patent: Feb. 18, 1997

[54] GRAB RINGS

[76] Inventor: John D. Guest, 'Iona' Cannon Hill Way, Bray, Maidenhead, Berkshire, United Kingdom, SL6 2EX

[21] Appl. No.: 374,258

[22] Filed: Jan. 18, 1995

[30] Foreign Application Priority Data

Jan. 19, 1994 [GB] United Kingdom ............... 9400912

[51] Int. Cl.$^6$ ................................................. F16L 37/088
[52] U.S. Cl. ........................... 285/305; 285/321; 285/322; 411/517
[58] Field of Search ................................. 285/305, 321, 285/104, 105, 340, 345, 322, 323; 411/517, 521, 353, 902, 905; 403/326

[56] References Cited

U.S. PATENT DOCUMENTS

| | | | |
|---|---|---|---|
| 2,201,372 | 5/1940 | Miller | 285/340 |
| 2,739,615 | 3/1956 | Wurzel | 285/340 |
| 2,999,701 | 9/1961 | Blair et al. | 285/340 |
| 3,058,762 | 10/1962 | Howe | 285/340 |
| 3,389,923 | 6/1968 | Love, Jr. et al. | 411/517 |
| 3,434,744 | 3/1969 | Yoke et al. | 285/340 |
| 3,920,270 | 11/1975 | Babb, Jr. | 285/104 |
| 4,676,533 | 6/1987 | Gerondale | 285/158 |
| 4,848,805 | 7/1989 | Bucher et al. | 285/105 |
| 4,867,484 | 9/1989 | Guest | 285/322 |
| 5,026,233 | 6/1991 | Carothen | 411/353 |
| 5,029,908 | 7/1991 | Belisaire | 285/340 |
| 5,160,179 | 11/1992 | Takagi | 285/340 |

FOREIGN PATENT DOCUMENTS

| | | | |
|---|---|---|---|
| 654535 | 11/1964 | Belgium | 285/321 |
| 526373 | 2/1993 | European Pat. Off. | 285/340 |
| 0373272 | 9/1993 | European Pat. Off. . | |
| 1335121 | 7/1963 | France | 285/340 |
| 1346933 | 11/1963 | France . | |
| 2102518 | 4/1972 | France . | |
| 2356036 | 6/1977 | France . | |
| 2547369 | 6/1983 | France . | |
| 853227 | 10/1952 | Germany | 411/517 |
| 1925171 | 11/1969 | Germany | 285/340 |
| 2354185 | 5/1974 | Germany . | |
| 4128007 | 2/1993 | Germany . | |
| 445800 | 2/1968 | Switzerland . | |
| 1001248 | 8/1965 | United Kingdom | 285/340 |
| 1081702 | 8/1967 | United Kingdom . | |
| 1478311 | 6/1977 | United Kingdom . | |
| 1530340 | 10/1978 | United Kingdom . | |
| 2103744 | 2/1983 | United Kingdom . | |
| 2172071 | 9/1986 | United Kingdom . | |
| 2172948 | 10/1986 | United Kingdom . | |

*Primary Examiner*—Eric K. Nicholson
*Attorney, Agent, or Firm*—Baker & Daniels

[57] ABSTRACT

The disclosure relates to a grab ring for locking a cylindrical component in a bore in another component. The ring may formed of L-shaped cross-section, one limb of which is part cylindrical form and the other limb of which extends radially with respect to the part cylindrical rim. The free edge of the radial limb has a multiplicity of teeth formed integrally with the rim and projecting outwardly therefrom at an oblique angle to allow the ring to slide past a bore ring component in one direction but to grip in the bore in the opposite direction.

8 Claims, 4 Drawing Sheets

GRAB RINGS

BACKGROUND TO THE INVENTION

1. Field of the Invention

This invention relates to grab rings for locking cylindrical components in bores in further components.

2. Background Prior Art

It is known to mount a grab ring in a cylindrical bore for locking a cylindrical component in the bore which the ring is formed from a spring steel having an outer periphery mounted in a groove encircling the cylindrical bore and an inner peripheral portion which is obliquely angled to bear against the outer periphery of the cylindrical component to be locked in the bore to allow the component to be inserted into the bore and to lock the component against withdrawal from the bore. Such grab rings may have resilient fingers projecting from their inner peripheries to engage and grip the component inserted through the ring. It is also known to lock a component in a cylindrical bore or on a cylindrical shaft by means of a circlip of part annular form to snap into a groove encircling a bore or for a groove inserting a cylindrical component. The part annular form of the clip enables the clip to be sprung outwardly to disengage it from a groove in a cylindrical component or inwardly to disengage it from a groove in a cylindrical bore.

SUMMARY OF THE INVENTION

This invention provides a grab ring for locking a cylindrical component in a bore in another component, the ring being formed in a spring metal with means to mount the ring in a groove in one of the components and means to grip a surface of the other component, wherein the ring has a radial slot to facilitate flexing of the ring for assembly in said groove.

Preferably, the slot extends over only a minor proportion of the circumference of the ring. Typically, the slot may extend over approximately one eighth of the circumference of the ring.

In any of the above arrangements the ring may be of L-shaped cross-section one limb of which is of part cylindrical form and the other limb of which extends radially with respect to the part cylindrical limb, the gripping means being formed along the free edge of the radial limb and the mounting means being formed along the free edge of the cylindrical limb.

In the latter arrangement the gripping means may comprise a multiplicity of teeth formed integrally with the radial limb and projecting outwardly therefrom at an oblique angle to allow a component to slide past the ring in one direction but to be gripped in the opposite direction.

Further, the mounting means for the ring may include upstanding resilient legs formed at spaced locations around the free edge of the cylindrical limb to hold the L-shaped member in a groove in a component.

In any of the above arrangements the ring may be encapsulated in a moulded plastics ring dimensioned to fit in the groove in the component.

DESCRIPTION OF THE PREFERRED EMBODIMENTS

Figure 1:
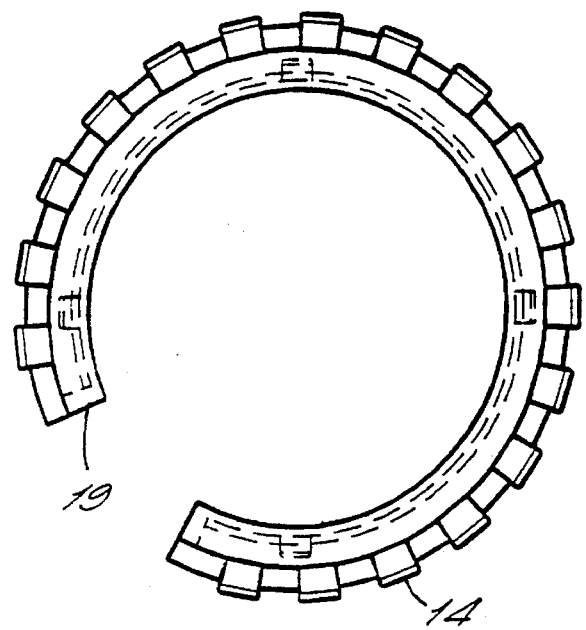
FIG. 1 is an elevation view of a grab ring according to the invention.
Figure 2:
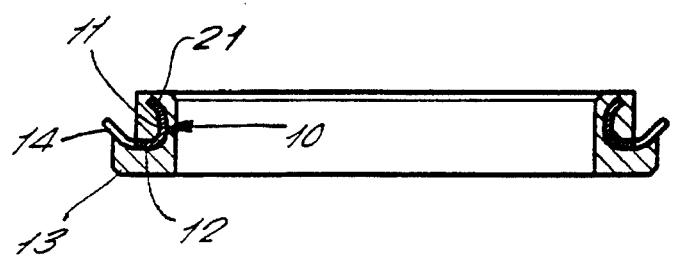
FIG. 2 is a section on the line 2—2 of FIG. 1.

Referring firstly to the arrangement shown in FIGS. 1 to 5 of the drawings, a grab ring is illustrated for mounting in a groove of a cylindrical component which is intended to be received and locked in a bore of a further component.

The grab ring comprises an L-shaped cross-section core indicated generally at 10, one limb 11 of which is part cylindrical and the other limb of which extends radially from the part cylindrical component. The core is encapsulated in a moulded plastics sleeve 13.

The free edge of the radial limb 12 is formed with a multiplicity of resilient teeth 14 around its periphery which are angled obliquely to the radial plane of the limb 12 to allow the ring to be slid along a bore in one direction but to resist movement in the opposite direction.

The free edge of the part cylindrical element 11 is formed with spaced, obliquely angled, legs 21 to provide stiffness in the axial direction. Thus, when the ring is inserted in an annular groove 15 in a generally cylindrical component 16, the ring is held firmly in the groove.

The component 16 with the ring assembled on it can then be inserted in a bore 17 in a body 18. The obliquely angled teeth 14 allow the ring to slide into the bore but resist and restrict extraction from the bore.

Figure 3:
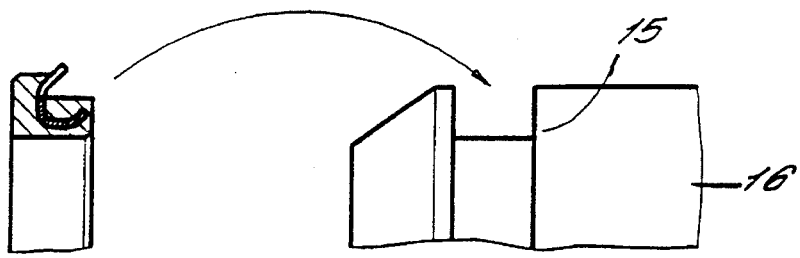
FIG. 3 is a cutaway view of a grab ring and grooved cylindrical member in which the ring is to be mounted.
Figure 4:
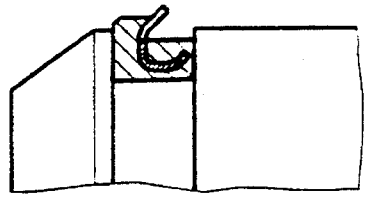
FIG. 4 is a similar view to FIG. 3 showing the ring mounted in the groove.
Figure 5:
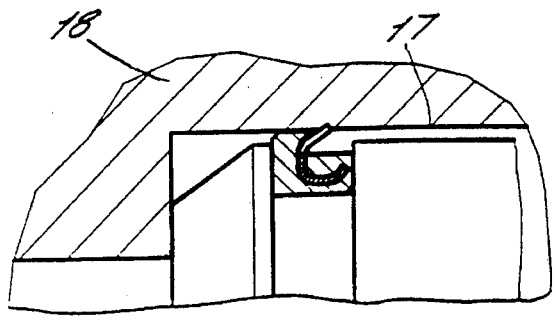
FIG. 5 shows the ring and component assembly inserted in a bore in a further component.
Figure 6:
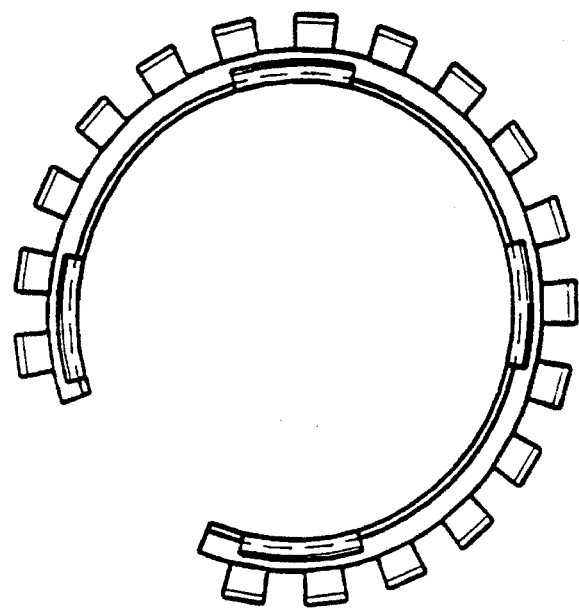
FIGS. 6 to 10 show similar views to FIGS. 1 to 5 with a modified form of the grab ring.
Figure 7:
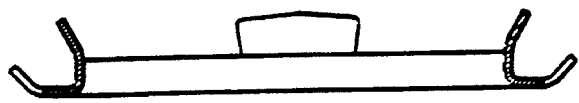
Figure 8:
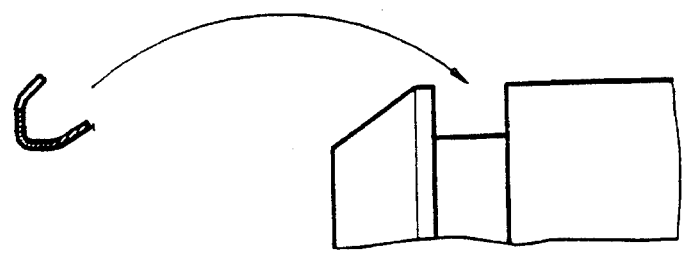
Figure 9:
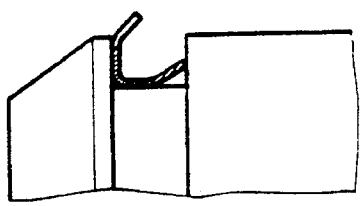
Figure 10:
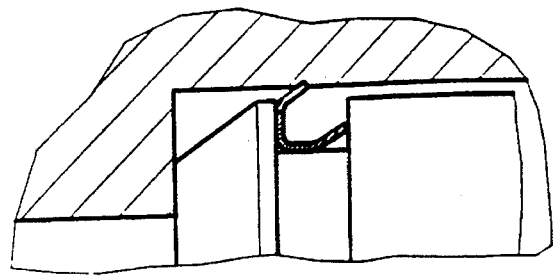
Figure 11:
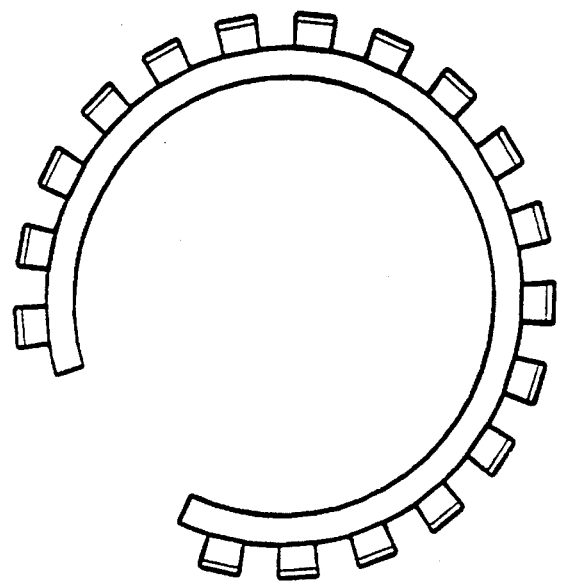
FIGS. 11 to 15 show similar views of a further form of grab ring.
Figure 12:
Figure 13:
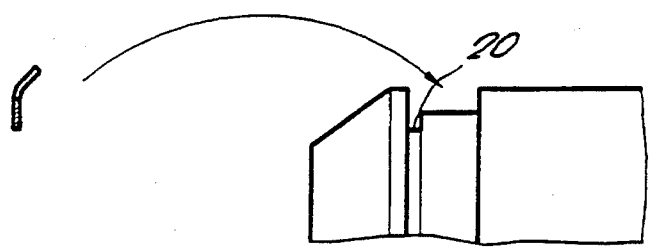
Figure 14:
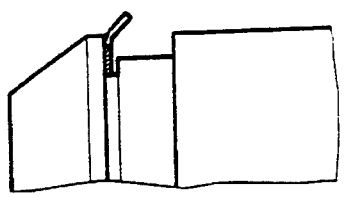
Figure 15:
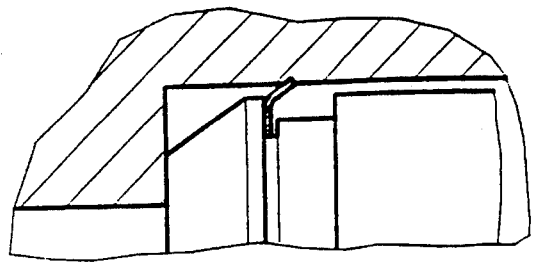

The ring is formed with a slot 19 part way around its circumference, the length of which is approximately one eighth of the total circumference of the ring. The slot permits the ring to be flexed inwardly and outwardly when assembling on a component as illustrated in FIG. 3.

FIGS. 6 to 10 of the drawings show a similar arrangement except that the plastics moulding in which the metal ring is inserted is omitted leaving the metal element to be inserted directly in a groove in a component.

FIGS. 11 to 15 show a further simplified arrangement in which the ring is of flat arcuate form 10 to engage in a narrow groove 20 in the cylindrical component with the obliquely angled teeth around the outer periphery of the arcuate form.

Figure 16:
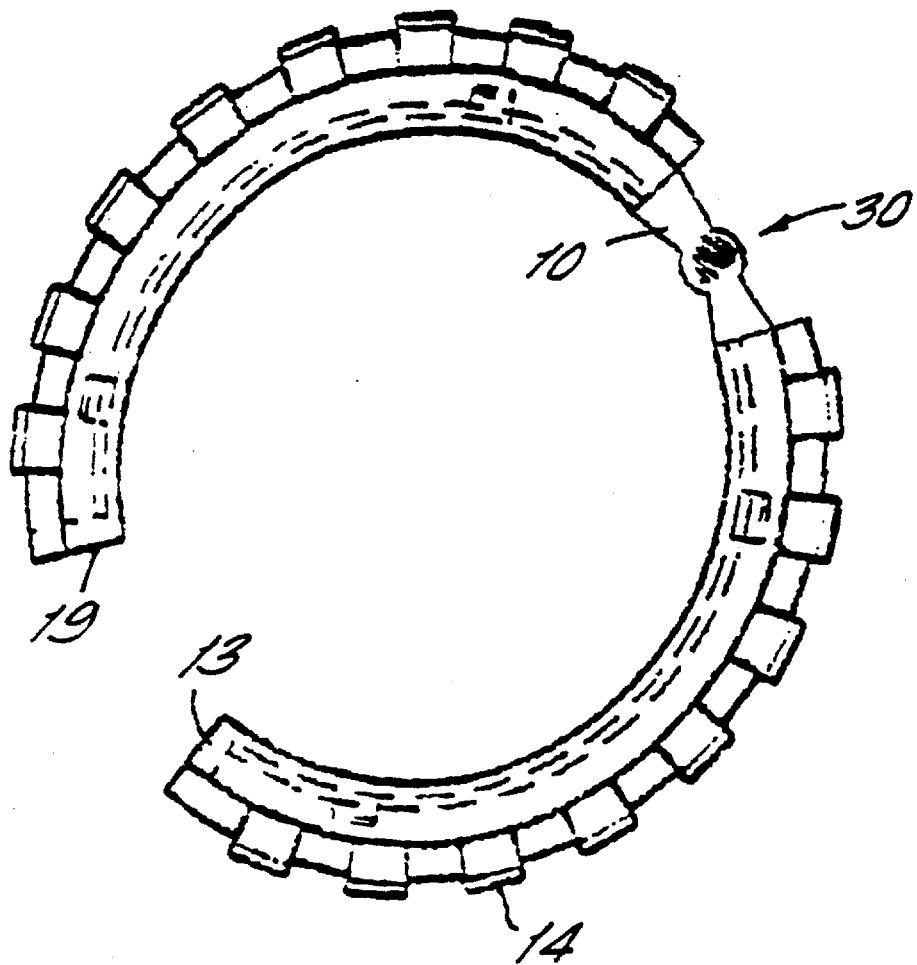
FIG. 16 shows a modification to the grab ring of FIG. 1.

Reference is now made to the grab ring of FIG. 16 which is generally similar to that of FIG. 1 and like parts have been alotted the same reference numerals. The ring of FIG. 16 is provided with a hinge point indicated generally at 30 directly opposite the slot to allow the ring to be opened for assembly around a component. In the region of the hinge point the plastics sleeve 13 is cut away and the hinge is formed by flattening the metal core 10 in the radial plane and by shaping the flattened portion to provide a fixed hinge axis and which the ring opens and closes. The core may be shaped so that the ring is biased to snap open or closed from an intermediate position in its travel. In a further arrangement the core is cut away and the hinge is formed in the plastics sleeve.

According to a further feature, a closure may be provided for the radial slot for holding the ring closed. For example only a very narrow slot may be provided in the ring and the ends of the ring may be shaped to interengage and lock together.

I claim:

1. A grab ring for locking a cylindrical component in a bore in another component, in which the ring is formed from spring metal and includes a means for mounting the ring in a groove in one of the components and a means for gripping a surface of the other component, the ring including a radial slot and a hinge to facilitate opening from a closed position of the ring for assembly in said groove in one of the components and to bias the ring into its closed position, the ring having an L-shaped cross-section and including two limbs, one limb being part-cylindrical and the other limb extending radially to the part-cylindrical limb, said part-cylindrical limb and radially extending limb each having a free edge, said mounting means extending along said free edge of said part-cylindrical limb to hold the ring in said groove in said one component and the gripping means extending along said free edge of said radial limb.

2. A grab ring as claimed in claim 1, wherein the slot extends over a minor proportion of the circumference of the ring.

3. A grab ring as claimed in claim 2, wherein the slot extends over approximately one eighth of the circumference of the ring.

4. A grab ring as claimed in claim 1, wherein the gripping means comprises a multiplicity of teeth formed integrally with the radial limb and projecting outwardly therefrom at an oblique angle to allow a component to slide past the ring in one direction but to be gripped in the opposite direction.

5. A grab ring as claimed in claim 1, wherein the mounting means for the ring includes upstanding resilient legs formed at spaced locations around the free edge of the cylindrical limb to hold the L-shaped member in a groove in a component.

6. A grab ring as claimed in claim 1, wherein the L-shaped cross-section ring is encapsulated in a moulded plastics ring dimensioned to fit in the groove in the component.

7. A grab ring as claimed in claim 1, wherein the integral hinge is formed to bias the ring into a fully open position when opened beyond an intermediate position.

8. A grab ring as claimed in claim 1, wherein means are provided to close the radial slot in the ring once the ring has been assembled on the component.

\* \* \* \* \*